(12) United States Patent
Huang et al.

(10) Patent No.: US 7,086,775 B2
(45) Date of Patent: Aug. 8, 2006

(54) BACKLIGHT MODULE FOR A LIQUID CRYSTAL DISPLAY DEVICE

(75) Inventors: Hsin Tao Huang, Hsinchu (TW); Chun Chien Chu, Banciao (TW)

(73) Assignee: Quanta Display Inc., Tao Yuan Shien (TW)

( * ) Notice: Subject to any disclaimer, the term of this patent is extended or adjusted under 35 U.S.C. 154(b) by 0 days.

(21) Appl. No.: 10/861,458

(22) Filed: Jun. 7, 2004

(65) Prior Publication Data

US 2005/0122739 A1    Jun. 9, 2005

(30) Foreign Application Priority Data

Dec. 3, 2003    (TW) .............................. 92134266 A

(51) Int. Cl.
*F21V 7/04*    (2006.01)

(52) U.S. Cl. ...................... 362/652; 362/377; 362/255; 362/221; 349/58; 349/70

(58) Field of Classification Search ................ 362/652, 362/97, 225, 221, 377, 633; 349/70, 58
See application file for complete search history.

(56) References Cited

U.S. PATENT DOCUMENTS

| | | | |
|---|---|---|---|
| 3,914,021 A * | 10/1975 | Nishimura | 349/58 |
| 4,247,884 A * | 1/1981 | McJunkin et al. | 362/164 |
| 5,537,296 A | 7/1996 | Kimura et al. | 362/31 |
| 5,815,227 A | 9/1998 | Lee | 349/67 |
| 6,135,620 A * | 10/2000 | Marsh | 362/377 |
| 6,431,726 B1 * | 8/2002 | Barton | 362/220 |
| 6,639,636 B1 * | 10/2003 | Yoo et al. | 349/61 |
| 6,880,953 B1 * | 4/2005 | Shin | 362/225 |
| 6,905,224 B1 * | 6/2005 | Yoo et al. | 362/225 |
| 2003/0086255 A1 | 5/2003 | Moon et al. | 362/97 |

FOREIGN PATENT DOCUMENTS

JP    4-366815    12/1992

* cited by examiner

*Primary Examiner*—Sandra O'Shea
*Assistant Examiner*—Jacob Y. Choi
(74) *Attorney, Agent, or Firm*—Bacon & Thomas, PLLC

(57) ABSTRACT

A backlight module for a liquid crystal display device is disclosed. The backlight module includes a bottom housing having at least one side frame that has a terminal installation part; a lamp bracket having a pair of opposing lamp supporters and a pair of opposing side shafts, wherein the lamp bracket is mounted on at least one side frame and can be moved relatively to at least one side frame; at least one first terminal mounted on the lamp supporters for conducting electrical signals; at least one lamp having a pair of electrodes engaging with at least one first terminal, wherein the electrode is at an end of the lamp; and at least one second terminal mounted on the terminal installation part, wherein at least one second terminal connects with an external driving device and has at least one electrical connecting surface for electrical connecting with the first terminal.

18 Claims, 11 Drawing Sheets

BACKLIGHT MODULE FOR A LIQUID CRYSTAL DISPLAY DEVICE

BACKGROUND OF THE INVENTION

1. Field of the Invention

The present invention relates to a backlight module for a liquid crystal display device and, more particularly, to a backlight module, of which the lamp can be disassembled and replaced with ease.

2. Description of Related Art

According to the location of light sources, the backlight module of the liquid crystal display device is classified as a side-light or edge-light type and a direct-light (bottom light) type. The side-light or edge-light type backlight module requires a light guide plate and is commonly applied to notebook computers. As for the direct-light type backlight module, it does not need a light guide plate and its lamps are mounted directly at the bottom of the backlight module. In the direct-light type backlight module, the light emitted from the lamps becomes uniform after passing through the diffusing plate and thereafter enters the liquid crystal panel. In recent years, manufacturers have increasingly paid attention to the liquid crystal display devices of a large size, such as the liquid crystal television. Generally, the liquid crystal television uses the direct-light type backlight module. In order to meet the requirement of high brightness, the quantity of lamps used in a direct-light type backlight module can be up to sixteen or more. Although the lifetime of a lamp can be more than 10,000 hours, it is still hard to prevent the non-uniform brightness caused by deterioration of lamps. Traditionally, when the lamp mounted in the direct-light type backlight module has deteriorated, the glass panel, the diffusing plate, the metal frame, the plastic frame, and so on have to be disassembled and then the deteriorated lamp can be changed. Therefore, the change of lamp is time-consuming, and can only be carried out by a professional. Furthermore, the maintenance cost of such a TV is high and the general consumers have to put up with the drawbacks aforementioned. Also, the popularization of liquid crystal television is hindered by such limitations.

Japanese Patent No. 4-366815 disclosed a reflective plate that was divided into a plurality of parts in order to facilitate the replacement of the lamps. However, it is mainly focused on the liquid crystal display device of small size or low brightness, which has few lamps. As for the liquid crystal display device of large size or high brightness, it usually has more than ten lamps. If the reflective plate is divided into so many reflective parts, not only will the assembling become complex, but also the rigidity of the reflective plate will be lowered. Consequently, the reflective plate will be easily loosened and broken, which will further lead to increases in both failure rate of products and manufacturing cost. Subject matters disclosed in U.S. Pat. Nos. 5,815,227 and 5,537,296 are suitable for the conventional side-light type backlight module. Moreover, the technique of U.S. Pat. No. 5,537,296 involves the mounting of a plurality of backlight modules, which is excessively complex in assembly and difficult to be implemented in direct-light type backlight module. U.S. Publication Patent No. 20030086255 disclosed a direct-type back light device. Although the subject matter disclosed in the U.S. Patent Publication No. 20030086255 can be applied to the liquid crystal display device that has plural lamps or large size, it is necessary to disassemble the external supports or the lamp holders when the lamp is changed. So it is time-consuming and easy to damage the lamps.

Therefore, it is desirable to provide a backlight module for a liquid crystal display device to mitigate and/or obviate the aforementioned problems.

SUMMARY OF THE INVENTION

The object of the present invention is to provide a backlight module, of which the lamp can be disassembled and changed with ease.

To achieve the object, the backlight module for a liquid crystal display device of the present invention includes a bottom housing having at least one side frame that has a terminal installation part; a lamp bracket having a pair of opposing lamp supporters and a pair of opposing side shafts, wherein the lamp bracket is mounted on at least one side frame and can be moved relatively to at least one side frame; at least one first terminal mounted on the lamp supporters for conducting electrical signals; at least one lamp having an electrode engaged in at least one first terminal, wherein the electrode is at an end of the lamp; and at least one second terminal mounted on the terminal installation part, wherein at least one second terminal connects with an external driving device and has at least one electrical connecting surface for connecting with the first terminal.

To achieve the object, the liquid crystal display device of the present invention includes a backlight module; at least one diffusing plate located adjacent to the backlight module for diffusing the light coming from the backlight module; a liquid crystal panel located adjacent to the diffusing plate for displaying images, wherein at least one diffusing plate is sandwiched between the backlight module and the liquid crystal panel; a top housing having a top opening for defining an active area and at least one side opening; and at least one side cover, which can be moved relatively to the side opening for revealing the backlight module; wherein the backlight module has a bottom housing having at least one side frame that has a terminal installation part; a lamp bracket having a pair of opposing lamp supporters and a pair of opposing side shafts, wherein the lamp bracket is mounted on at least one side frame and can be moved relatively to at least one side frame; at least one first terminal mounted on the lamp supporters for conducting electrical signals; at least one lamp having an electrode engaged in at least one first terminal, wherein the electrode is at an end of the lamp; and at least one second terminal mounted on the terminal installation part, wherein at least one second terminal connects with an external driving device and has at least one electrical connecting surface for connecting with the first terminal.

Other objects, advantages, and novel features of the invention will become more apparent from the following detailed description when taken in conjunction with the accompanying drawings.

DETAILED DESCRIPTION OF THE PREFERRED EMBODIMENT

Figure 1A:
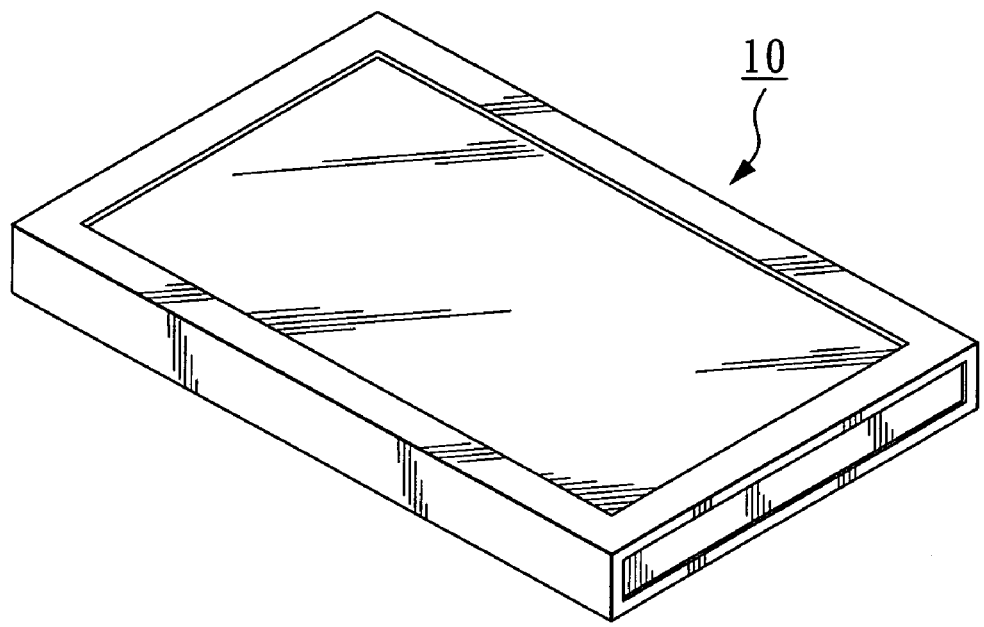
FIG. 1A is a perspective view of the liquid crystal display device of the present invention.
Figure 1B:
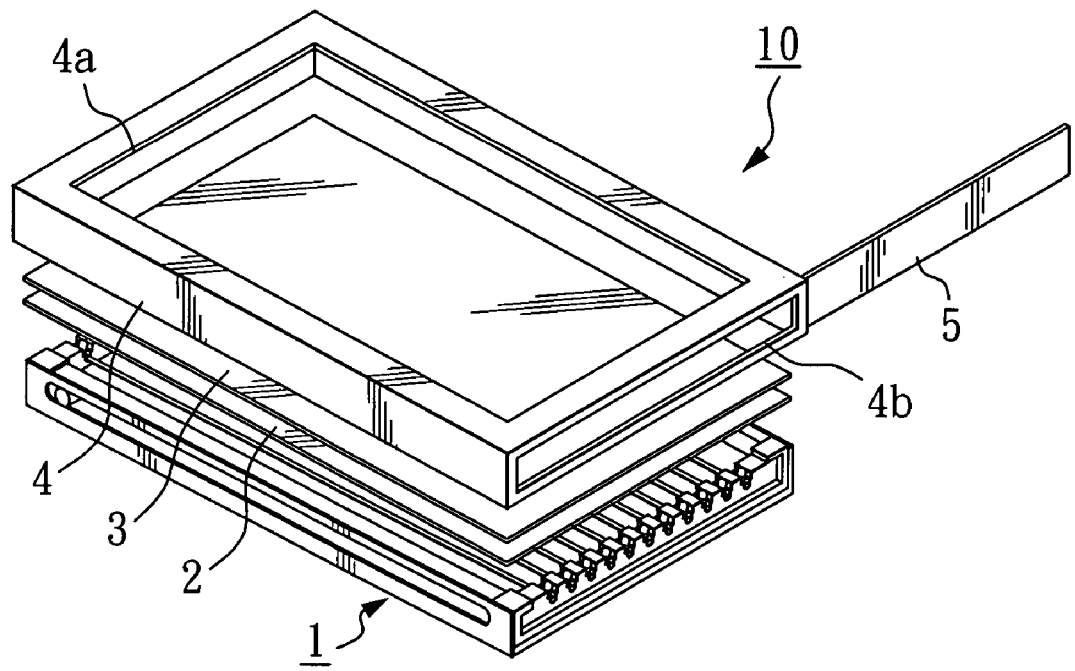
FIG. 1B is an exploded perspective view of the liquid crystal display device of the present invention.

With reference to FIGS. 1A and 1B, in a liquid crystal display device 10, a backlight module 1 provides light, which subsequently passes through a diffusing plate 2 and becomes uniform, and then enters a liquid crystal panel 3 to display images. All the components above-mentioned are fixed by a top housing 4, which has a top opening 4a that defines an active area and a side opening 4b.

Figure 2A:
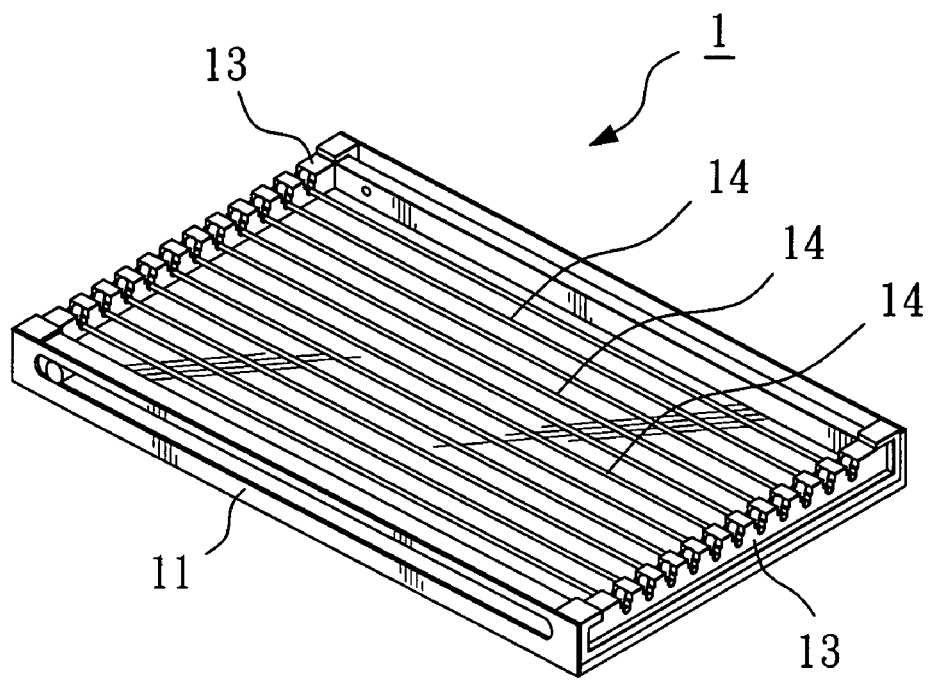
FIG. 2A is a perspective view of the backlight module of the present invention.

With reference to FIG. 2A, there is shown a perspective view of a backlight module 1 showing the relative position of each component in normal operating status. A plurality of lamps 14 is mounted on the lamp supporters 13, which are wholly received in the bottom housing 11.

Figure 2B:
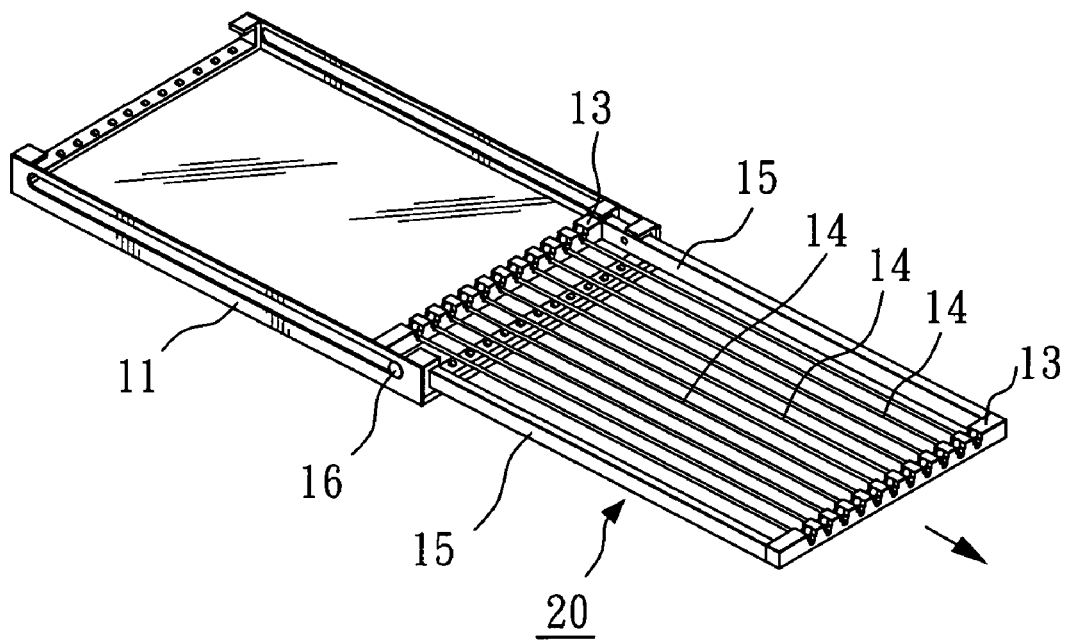
FIG. 2B is a perspective view showing the replacement of the lamps of the present invention.

With reference to FIGS. 1B and 2B, FIG. 2B shows the relative position of each component while replacing the lamp. A lamp bracket 20 is composed of the lamp supporters 13 and the side shafts 15. The lamps 14 are engaged in the lamp supporters 13. When the lamps 14 are going to be changed, a side cover 5 is pulled out firstly to reveal the backlight module 1, as shown in FIG. 1B. Next, the lamp bracket 20 is pulled out of the bottom housing 11. At the same time, the lamps 14 are also pulled out so that users can change them easily.

Figure 2C:
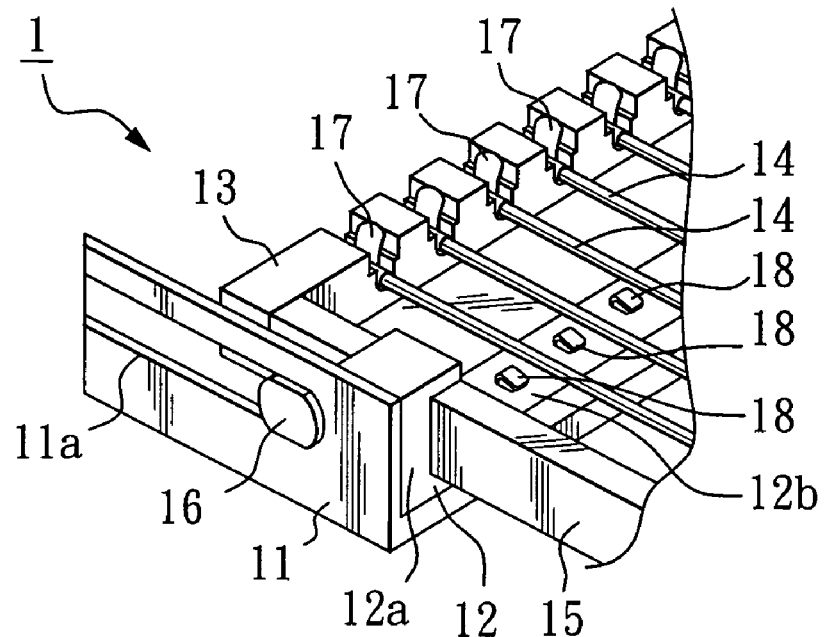
FIG. 2C is an enlarged perspective view of the backlight module of the present invention.
Figure 3:
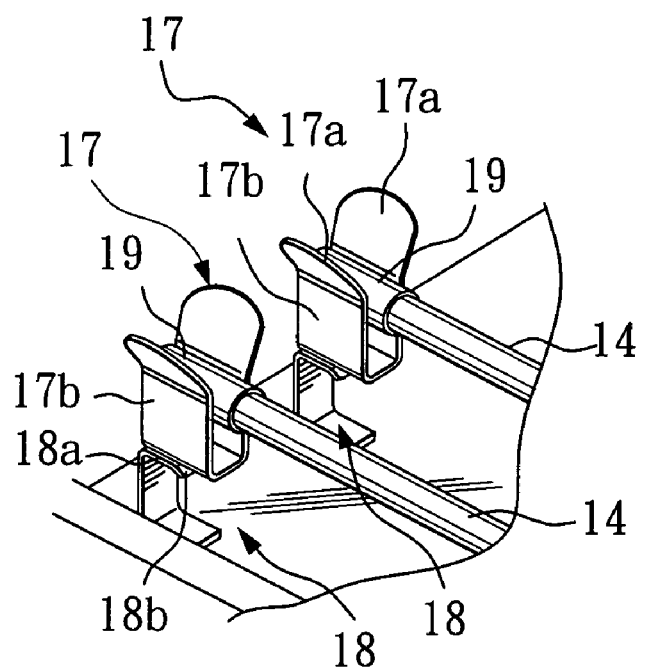
FIG. 3 is an enlarged perspective view showing the terminals of the present invention.

Please refer to FIGS. 2C and 3 for further description of how the lamp bracket 20 is pulled out and how the lamps are changed. FIG. 2C is a perspective view of the backlight module showing the relative position of each component while replacing the lamp (partial enlargement of FIG. 2B); and FIG. 3 is an enlarged perspective view showing the relative position of each electrical component in normal operating status (partial enlargement of FIG. 2A). The first terminals 17 that are electrically conductive are mounted on the lamp supporters 13, as shown in FIG. 2C. Moreover, each of the lamps 14 has an electrode 19 (in FIG. 3) at its end for conducting electrical signals and driving the lamps. Each of the first terminals 17 has a lamp-guiding-groove 17a in a shape of "V". When the user wants to install the lamps 14, the lamp-guiding-groove 17a can guide the lamps 14 into the substantial parts 17b (in FIG. 3) of the first terminals 17, and thus the electrode 19 can connect with the substantial parts 17b.

With reference to FIG. 2C, the second terminal 18 is mounted on the terminal installation part 12b of the side frame 12, which is disposed on the side edges of the bottom housing 11. The root of the second terminal 18, which is electrically conductive, connects with an external lamp driving device (not shown in the figure). With reference to FIG. 3, when the backlight module 1 is in normal operating status, the bottom surface of the first terminal 17 contacts with the electrical connecting surface 1 8a of the second terminal 18 in order to transmit the electrical signals. Therefore, the external signals can arrive at the electrode 19 and then drive the lamp to radiate after passing the second terminal 18 and the first terminal 17.

When the user wants to take out the lamps 14, what he or she has to do is to make the electrode 19 come off the first terminal 17 only. Furthermore, the terminal guiding surface 18b of the second terminal 18 can be a bevel surface or a round surface so that the first terminal 17 can be attached to the second terminal 18 smoothly.

With reference to FIG. 2C, in order to increase the stability of pulling the lamp bracket 20 and to facilitate the operation for the nonprofessional, two sliding grooves 11a are formed respectively at a pair of opposing sides of the bottom housing 11, and two sliding protrusions 16 are formed respectively at the external sides of the side shafts 15. The sliding protrusions 16 are held by the sliding grooves 11a for guiding the movement of the lamp bracket 20 and increasing the operation stability when the lamp bracket 20 is pulled. Moreover, the engaging part 12a of the side frame 12 has a U shape profile, which can engage with the side shafts 15 and thus confine the movement of the lamp bracket 20. Through the guiding and confinement above-mentioned, the operation stability of pulling the lamp bracket 20 can be improved, and unnecessary damage can thus be prevented.

Figure 5:
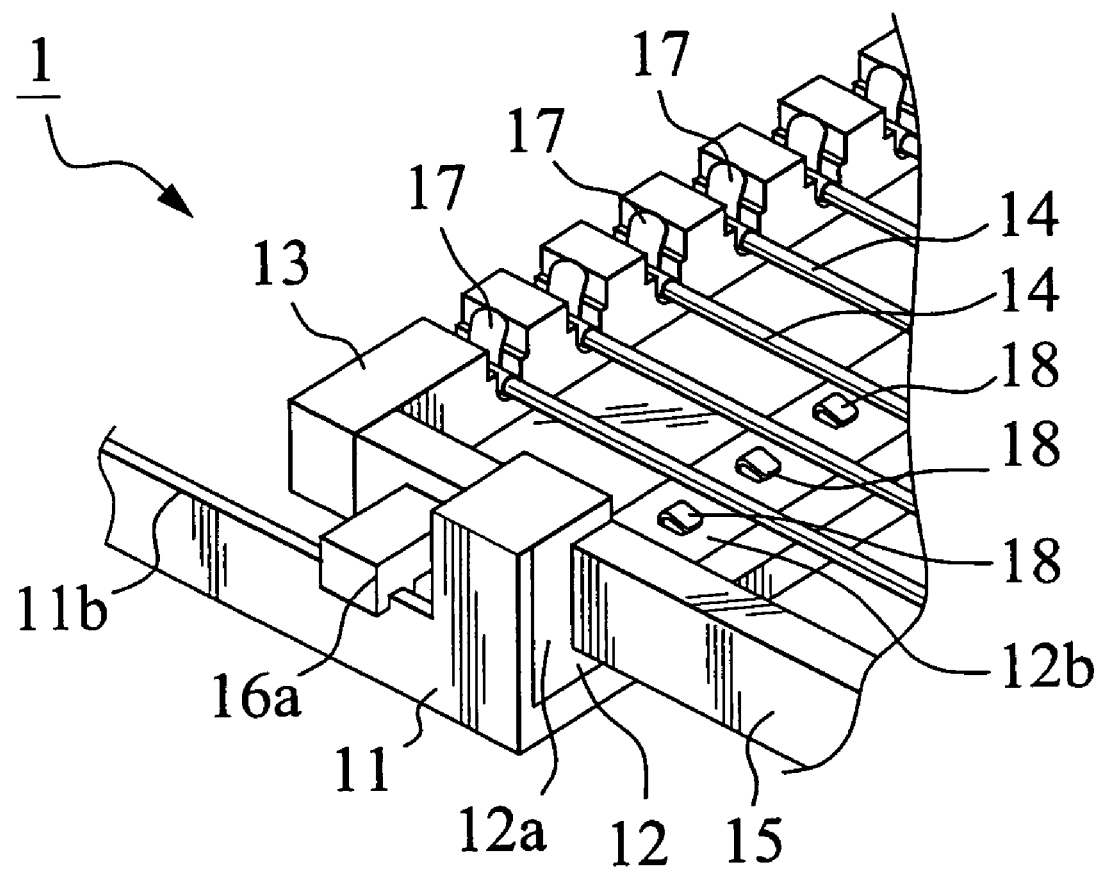
FIG. 5 is an enlarged perspective view of the backlight module of the present invention.
Figure 6A:
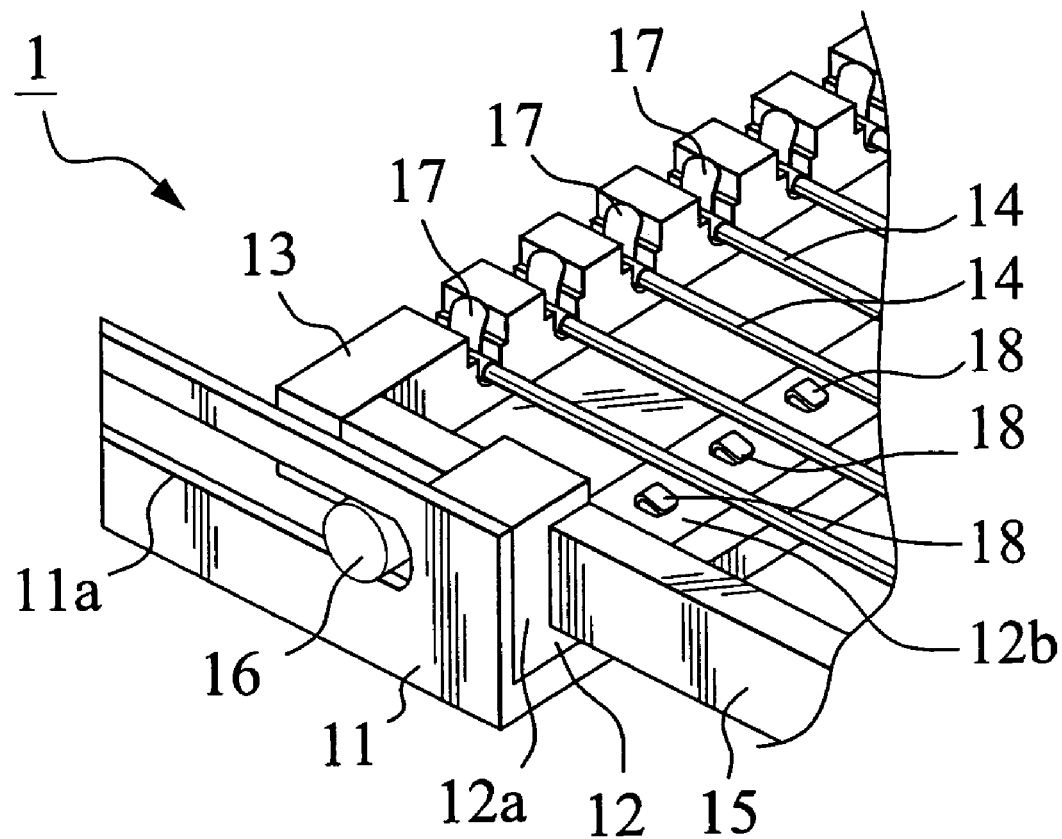
FIG. 6A is an enlarged perspective view of the backlight module of the present invention.
Figure 6B:
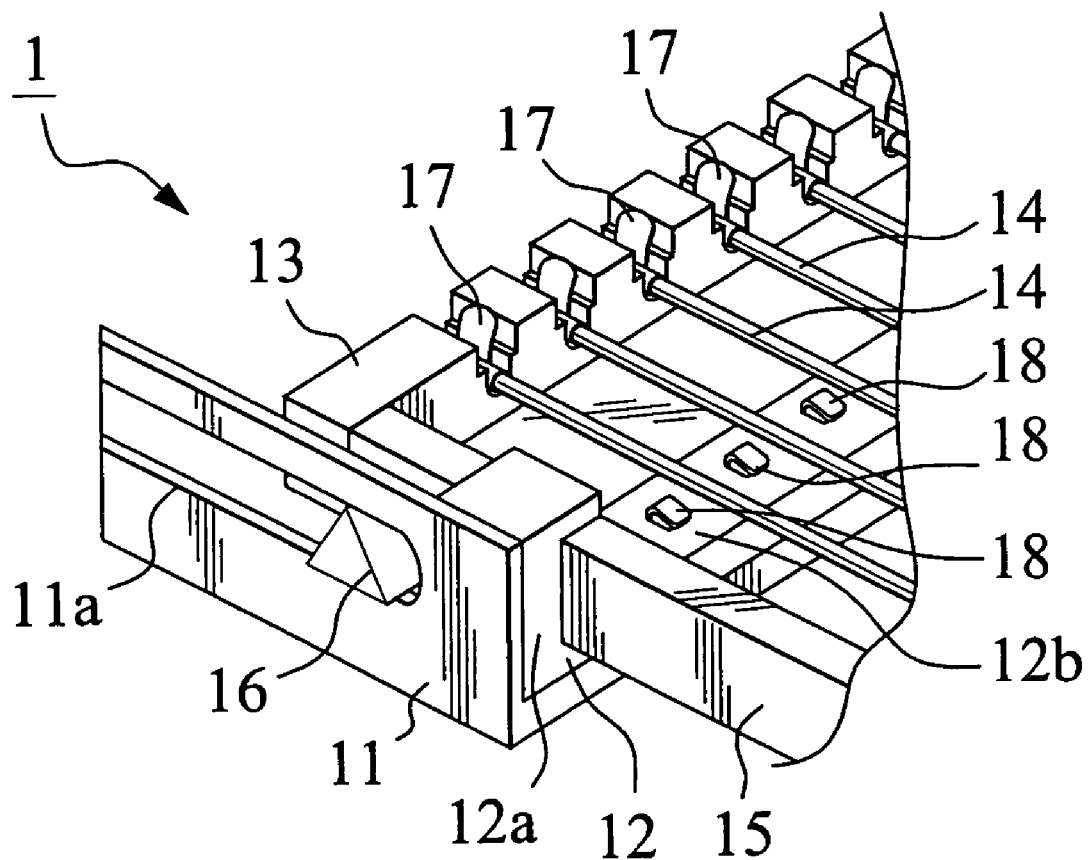
FIG. 6B is an enlarged perspective view of the backlight module of the present invention.
Figure 6C:
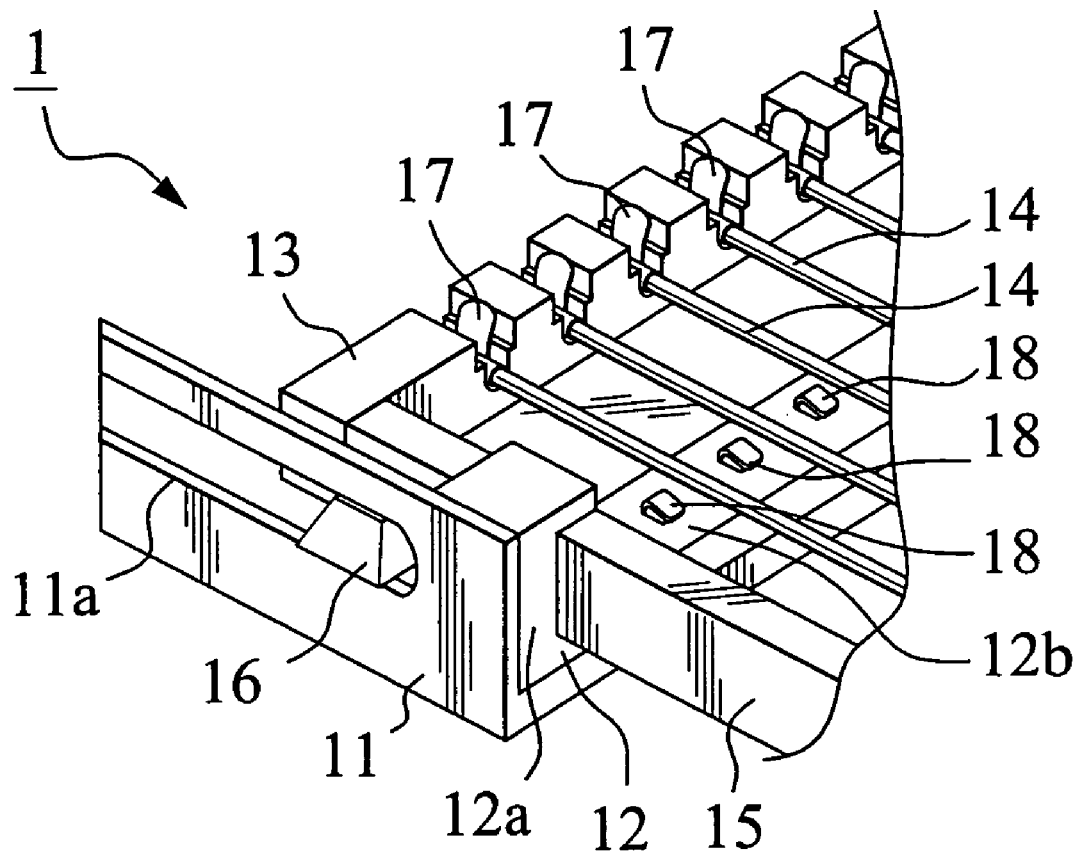
FIG. 6C is an enlarged perspective view of the backlight module of the present invention.
Figure 7:
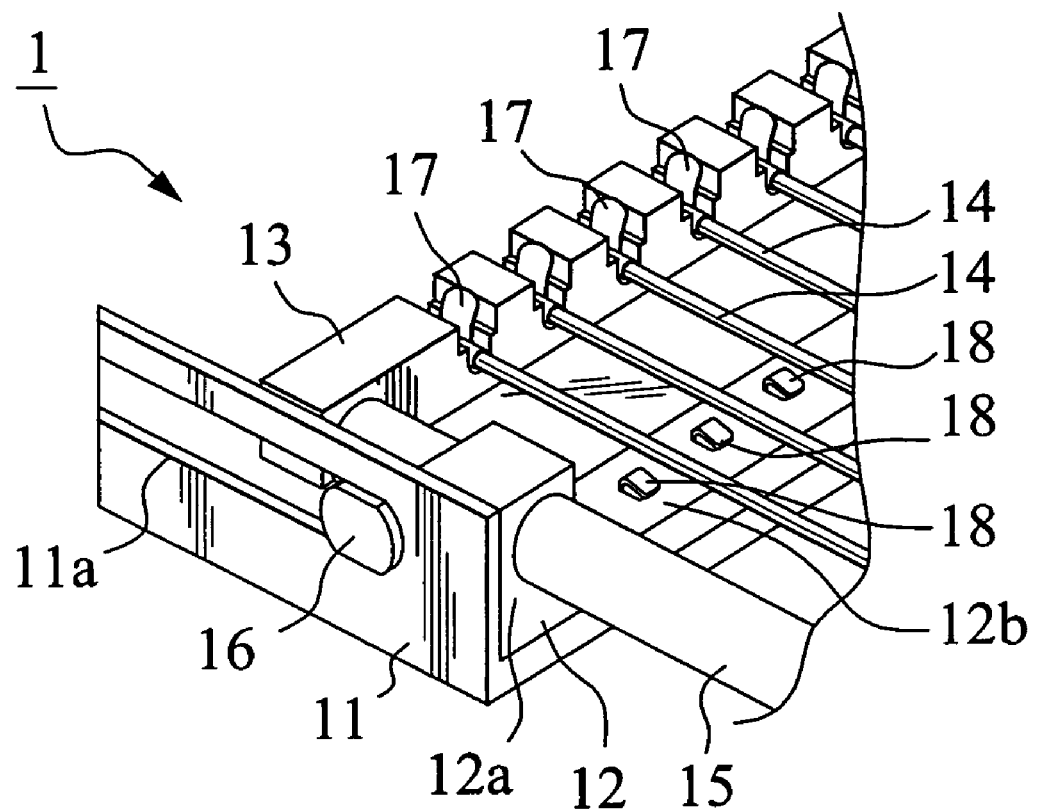
FIG. 7 is an enlarged perspective view of the backlight module of the present invention.
Figure 8A:
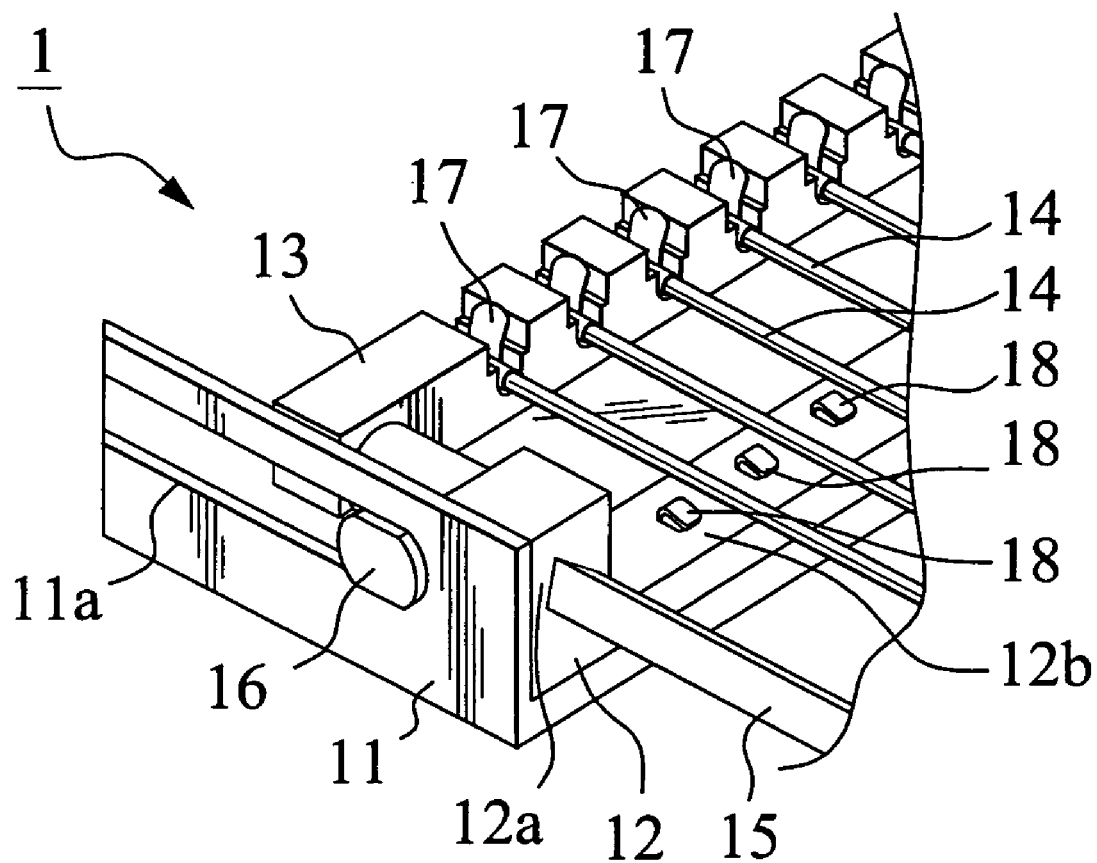
FIG. 8A is an enlarged perspective view of the backlight module of the present invention.
Figure 8B:
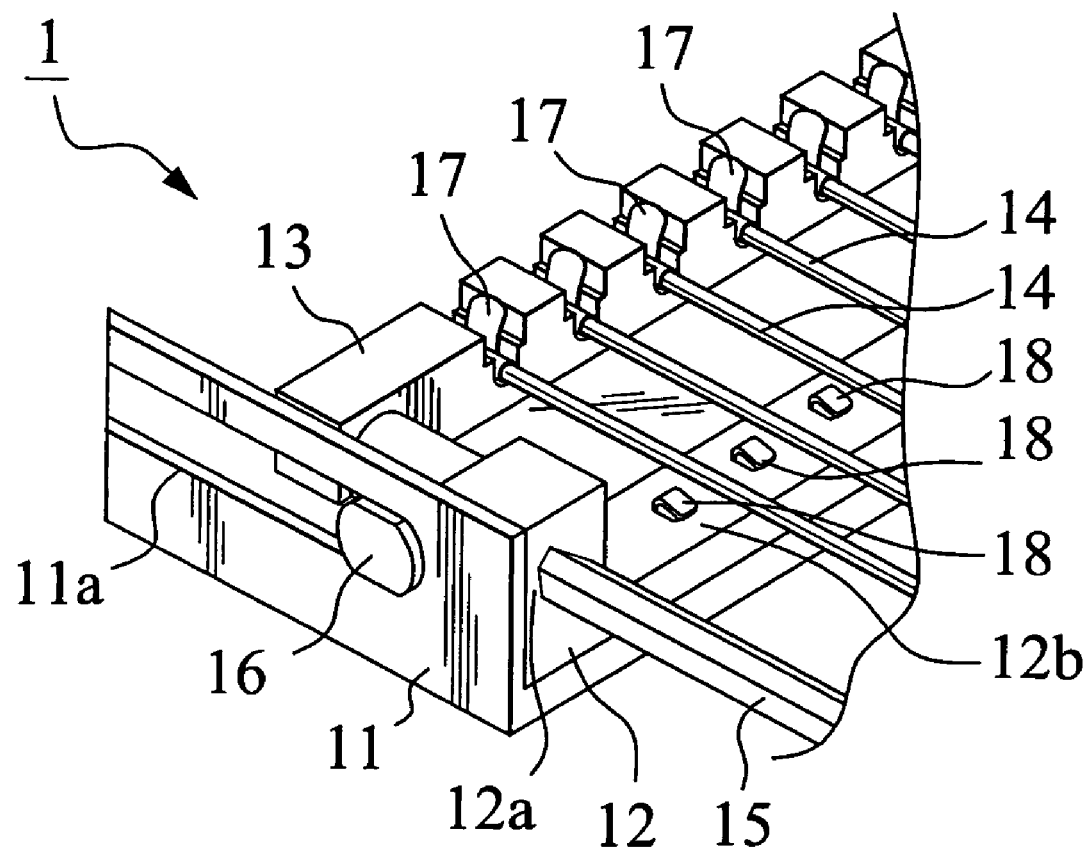
FIG. 8B is an enlarged perspective view of the backlight module of the present invention.

Anyone skilled in the arts can easily infer that the sectional shape of the sliding protrusion 16 can be any shape, such as circular (FIG. 6A), rectangular, triangular (FIG. 6B), trapezoidal (FIG. 6C), or polygonal that can cooperate with the sliding grooves 11a for guiding and confining the movement of the lamp bracket 20. In addition to that, the profile of the engaging part 12a of the side frame 12 is not restricted to a U shape, as long as the side shaft 15 can engage with the engaging part 12a and provide the guiding and confining functions. The engaging part 12a with a U shape profile corresponds to the side shaft 15 with a rectangular section. Accordingly, as shown in FIG. 7. the side shaft 15 can have a circular section, which corresponds to the engaging part 12a with a circular hole in its interior. The side shaft 15 can also have a triangular shape. as shown in FIG. 8A, a trapezoidal shape as shown in FIG. 8B, or a polygonal section (not shown). Moreover, as shown in FIG. 5, if there is available space, the sliding groove 11a and the sliding protrusion 16 can also be replaced respectively with linear guiding elements such as linear sliding rail 11b and a linear sliding block 16a.

Furthermore, both the first terminal 17 and the second terminal 18 are made of electrically conductive materials. Generally, the first terminal 17 and the second terminal 18 are made of copper or copper alloy, which has good ductility and is easy for Cold Work. Besides, the surface of copper can be treated with antirust processes by, for example, electroplating or passivation.

Figure 4:
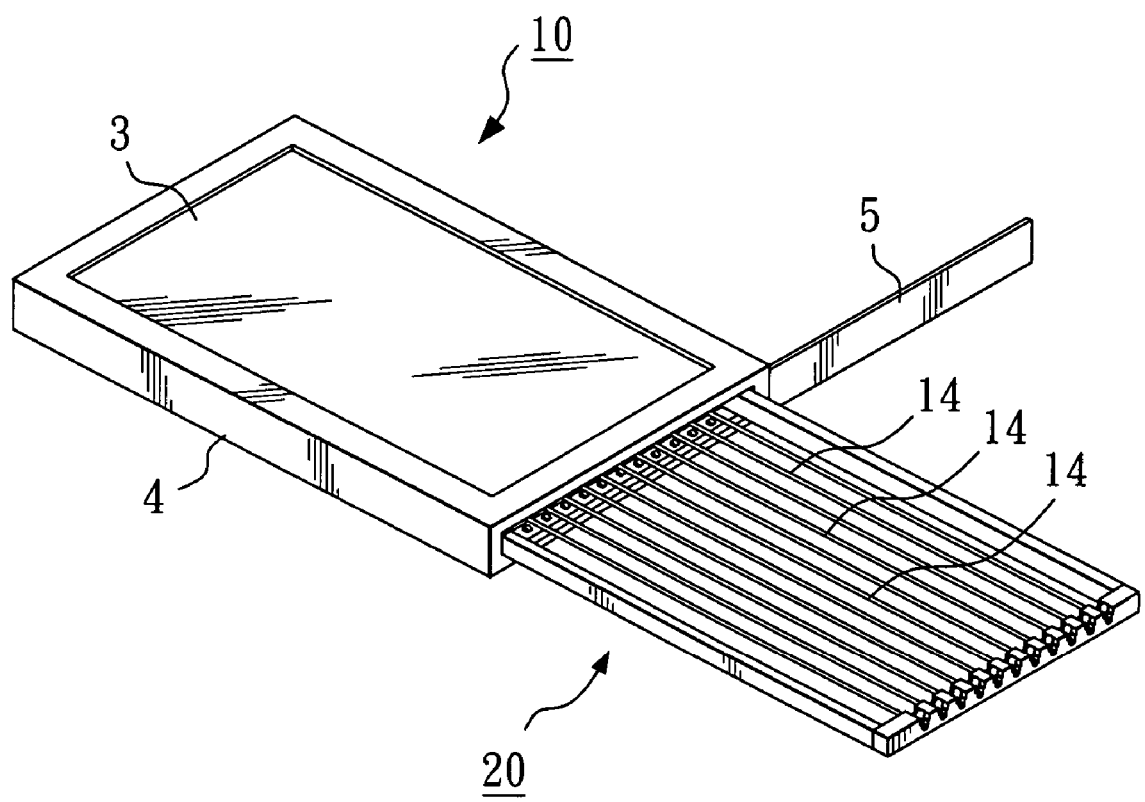
FIG. 4 is a perspective view showing the replacement of the lamps of the present inventuion.

With reference to FIG. 4, when one or more lamps are damaged, what one has to do is to draw out or open the side cover 5 and to pull out the lamp bracket 20, and then the damaged lamps can be changed with ease. After the maintenance of the lamps, only the lamp bracket 20 and the side cover 5 need to be pulled back, and thus the replacement is finished.

Compared with the prior arts, the present invention obviously has the following advantages:

(I) Lowering the cost for repair: No accessory, such as the glass panel, the diffusing plate, the metal frame, or the plastic frame needs to be disassembled. Therefore, significant repair time and cost can be saved.

(II) Easy operation: Only the side cover needs to be pulled out or opened, and then the lamp bracket can be pulled out of the bottom housing. In addition to that, the replacement of the lamp is very easy because the lamps are mounted on the lamp supporter only by being engaged with the terminals.

(III) Being contributive to the popularization of liquid crystal televisions: No professional technique or training is required for changing the lamp and any layperson can do it easily. Hence, it is helpful for popularizing the liquid crystal televisions and raising the customer's desire to purchase such TVs.

Although the present invention has been explained in relation to its preferred embodiment, it is to be understood that many other possible modifications and variations can be made without departing from the spirit and scope of the invention as hereinafter claimed.

What is claimed is:

1. A backlight module for a liquid crystal display device comprising:
   a bottom housing having at least one side frame, wherein the side frame comprises a terminal installation part;
   a lamp bracket having a pair of opposing lamp supporters and a pair of opposing side shafts, wherein the lamp bracket is held on the bottom housing and can be moved relatively to the side frame from a first position to a second position;
   at least one first terminal mounted on the lamp supporters of the lamp bracket for conducting electrical signals;
   at least one lamp each having a pair of electrodes arranged to be engaged with the first terminal, wherein each electrode is located at one end of the lamp, and wherein said electrodes may be disengaged and removed from said first terminal to permit replacement of said lamp when said bracket is in said first position; and
   at least one second terminal mounted on the terminal installation part of the side frame, wherein the second terminal has an electrical connecting surface arranged to be electrically connected with the first terminal when said bracket is moved from said first position to said second position.

2. The backlight module as claimed in claim 1, further comprising two guiding elements, wherein the two guiding elements mounted on the bottom housing and the side shaft of the lamp bracket for guiding and confining the movement of the lamp bracket.

3. The backlight module as claimed in claim 2, wherein the guiding elements comprise a sliding protrusion and a sliding groove.

4. The backlight module as claimed in claim 2, wherein the guiding elements comprise a sliding rail and a linear sliding block.

5. The backlight module as claimed in claim 3, wherein the sectional shape of the sliding protrusion is circular, triangular, or trapezoidal.

6. The backlight module as claimed in claim 1, wherein the side frame further comprises an engaging part that can engage with said engages the side shafts of the lamp bracket for guiding and confining the movement of lamp bracket.

7. The backlight module as claimed in claim 6, wherein said the engaging part has a U-shaped profile and the side shaft has a rectangular cross-section.

8. The backlight module as claimed in claim 6, wherein said the engaging part has a circular hole in the interior of the engaging part and the side shaft has a circular cross-section.

9. The backlight module as claimed in claim 6, wherein the engaging part has a triangular, trapezoidal, or polygonal hole in the interior of the engaging part and the side shaft has a corresponding triangular, or trapezoidal cross-section.

10. The backlight module as claimed in claim 1, wherein the first terminal has at least one lamp-guiding-groove for guiding the lamp to engage with the first terminal when the lamp is changed.

11. The backlight module as claimed in claim 1, wherein the second terminal further comprises a terminal guiding surface for guiding the first terminal to engage the second terminal.

12. The backlight module as claimed in claim 11, wherein the terminal guiding surface is a bevel surface or a round surface.

13. The backlight module as claimed in claim 1, wherein both the first terminal and the second terminal are made of electrically conductive materials.

14. A liquid crystal display device comprising:
   a backlight module;
   at least one diffusing plate located adjacent to the backlight module for diffusing the light coming from the backlight module;
   a liquid crystal panel located adjacent to the diffusing plate for displaying images, wherein at least one the diffusing plate is sandwiched between the backlight module and the liquid crystal panel;
   a top housing having a top opening for defining an active area and at least one side opening; and
   at least one side cover capable of being moved relatively to said the side opening of the top housing for revealing the backlight module;

wherein the backlight module comprises:

a bottom housing having at least one side frame, wherein the side frame comprises a terminal installation part;

a lamp bracket having a pair of opposing lamp supporters and a pair of opposing side shafts, wherein the lamp bracket is held on the bottom housing and can be moved relatively to the side frame from a first position to a second position;

at least one first terminal mounted on the lamp supporters of the lamp bracket for conducting electrical signals;

at least one lamp each having a pair of electrodes arranged to be engaged with the first terminal, wherein each electrode is located at one end of the lamp and wherein said electrodes may be disengaged and removed from said first terminal to permit replacement of said lamp when said bracket is in said first position; and at least one second terminal mounted on the terminal installation part of the side frame, wherein the second terminal has an electrical connecting surface arranged to be electrically connected with the first terminal when said bracket is moved from said first position to said second position.

15. The liquid crystal display device as claimed in claim 14, wherein the backlight module further comprises two guiding elements, and the two guiding elements are mounted on the bottom housing and the side shaft of the lamp bracket for guiding and confining the movement of the lamp bracket.

16. The liquid crystal display device as claimed in claim 14, wherein the side frame further comprises an engaging part that enganes the side shafts of the lamp bracket for guiding and confining the movement of the lamp bracket.

17. The liquid crystal display device as claimed in claim 14, wherein the first terminal has at least one lamp-guiding-groove for guiding lamp to engage with the first terminal when the lamp is changed.

18. The liquid crystal display device as claimed in claim 14, wherein the second terminal further comprises a terminal guiding surface for guiding the first terminal to engage with the second terminal.

* * * * *